United States Patent
Venkata et al.

(10) Patent No.: US 10,649,944 B2
(45) Date of Patent: May 12, 2020

(54) CONFIGURATION VIA HIGH SPEED SERIAL LINK

(71) Applicant: Altera Corporation, San Jose, CA (US)

(72) Inventors: Ramanand Venkata, Fremont, CA (US); Gopi Krishnamurthy, Tracy, CA (US)

(73) Assignee: Altera Corporation, San Jose, CA (US)

( * ) Notice: Subject to any disclaimer, the term of this patent is extended or adjusted under 35 U.S.C. 154(b) by 54 days.

(21) Appl. No.: 15/633,431

(22) Filed: Jun. 26, 2017

(65) Prior Publication Data

US 2017/0357606 A1  Dec. 14, 2017

Related U.S. Application Data

(63) Continuation of application No. 13/942,532, filed on Jul. 15, 2013, now Pat. No. 9,690,741.

(51) Int. Cl.
*G06F 13/40* (2006.01)
*G06F 13/42* (2006.01)

(52) U.S. Cl.
CPC ...... *G06F 13/4068* (2013.01); *G06F 13/4282* (2013.01)

(58) Field of Classification Search
CPC .. G06F 13/40; G06F 13/4068; G06F 13/4282; G06F 17/5045
See application file for complete search history.

(56) References Cited

U.S. PATENT DOCUMENTS

| | | | |
|---|---|---|---|
| 5,978,862 A | 11/1999 | Kou et al. | |
| 7,426,597 B1* | 9/2008 | Tsu | G06F 13/4018 710/307 |
| 7,626,418 B1 | 12/2009 | Kolze et al. | |
| 8,917,111 B1* | 12/2014 | Puranik | H03K 19/17748 326/38 |

FOREIGN PATENT DOCUMENTS

| | | |
|---|---|---|
| CN | 1711724 A | 12/2005 |
| CN | 101198943 A | 6/2008 |
| CN | 102318289 A | 1/2012 |

OTHER PUBLICATIONS

Altera Corporation, May 2011, "Configuration via Protocol white paper" (Year: 2011).*
Chinese Office Action for CN Application No. 201410336266.3 dated Jan. 10, 2018; 8 Pages.
Altera Corporation, "FPGA Configuration via Protocol White Paper", May 2011.

(Continued)

*Primary Examiner* — Tim T Vo
*Assistant Examiner* — Phong H Dang
(74) *Attorney, Agent, or Firm* — Fletcher Yoder P.C.

(57) ABSTRACT

Mechanisms and techniques for configuring a configurable slave device using a high speed serial link where a different number of lanes of the high speed serial link are used to send data between the slave device and a master device, depending on whether the slave device is in configuration mode or in normal operations mode, are provided.

25 Claims, 6 Drawing Sheets

(56) References Cited

OTHER PUBLICATIONS

Altera Corporation, "Configuring Arria GX Devices," Arria GX Device Handbook, vol. 2, May 2008.
Altera Corporation, "Configuration and Remote System Upgrades in Cyclone IV Devices," Cyclone IV Device Handbook, vol. 1, May 2013.
Altera Corporation, "Configuration Stratix & Stratix GX Devices," Stratix GX Device Handbook, vol. 3, Jul. 2005.

* cited by examiner

CONFIGURATION VIA HIGH SPEED SERIAL LINK

This is a continuation of U.S. patent application Ser. No. 13/942,532, entitled "Configuration via High Speed Serial Link", filed Jul. 15, 2013, which is herein incorporated by reference in its entirety for all purposes.

FIELD OF THE INVENTION

The present disclosure relates generally to configuration of integrated circuits, and, more particularly, to techniques and mechanisms for configuring integrated circuits over high speed serial links.

BACKGROUND

As computer systems have evolved, the ability to transfer data at high speeds has become increasingly important. One development that has aided that goal is the use high speed serial connections. Such high speed serial links are often implemented as a group of lanes, each lane used to transport a portion of data between two devices. Dividing data into sub-blocks, and sending each sub-block over a different high speed serial lane, allows for scalable high bandwidth.

One context in which high speed serial interfaces can be useful is serving as connections between a master device and a slave configurable device. Examples of such slave configurable devices include Field Programmable Gate Arrays (FPGAs) and Programmable Logic Device (PLDs). Such devices contain hardware capable of being configured in different ways, thus permitting a user to implement different designs without having to undergo a lengthy and expensive process required for designing and fabricating hardware to perform different functions.

Various embodiments of the present disclosure seek to improve upon techniques and mechanisms for configuring an integrated circuit using high speed serial links.

BRIEF DESCRIPTION OF THE DRAWINGS

Techniques and mechanisms are provided for configuring an integrated circuit using high speed serial links.

These techniques and mechanisms, together with other features, embodiments, and advantages of the present disclosure, may best be understood by reference to the following description taken in conjunction with the accompanying drawings, which illustrate various embodiments of the present techniques and mechanisms. In the drawings, structural elements having the same or similar functions are denoted by like reference numerals.

DESCRIPTION OF PARTICULAR EMBODIMENTS

Overview

Figure 1:
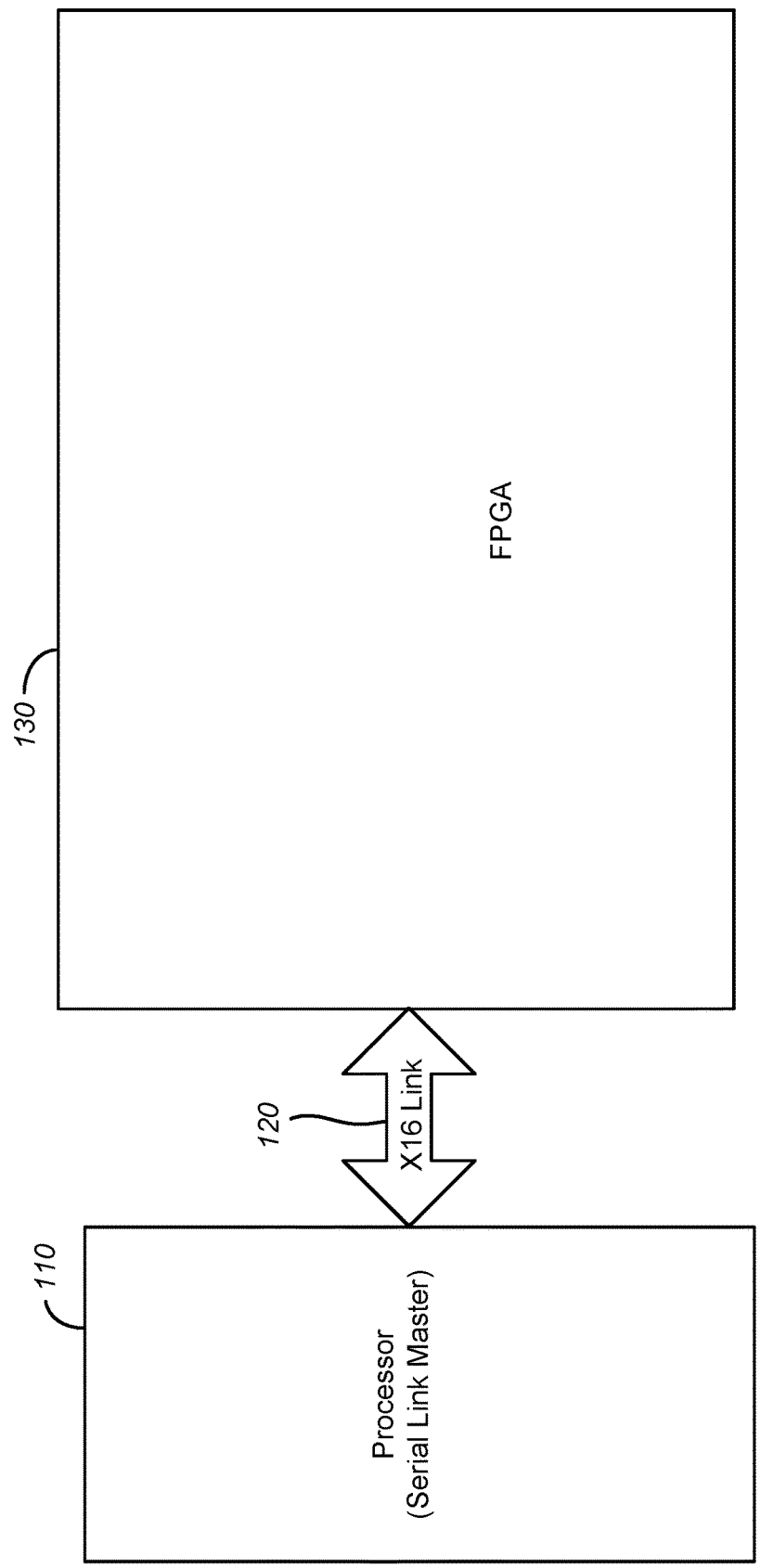
FIG. 1 is a simplified block diagram of a master device and a slave configurable device according to an embodiment of the present disclosure.

Techniques and mechanisms for configuring an integrated circuit using high speed serial links is described.

According to an embodiment of the present disclosure, a method for configuring a configurable slave device using high speed serial links where a different number of lanes are utilized depending on whether the slave device is in configuration mode or in normal operations mode, is provided. In one embodiment, a method for configuring a device using a high speed serial link is provided. A slave device negotiates a first high speed serial link containing a first number of high speed serial lanes with a master device for use during a first configuration mode. The slave device receives configuration data from the master device over the first high speed serial link and uses that configuration data to configure distributed configuration blocks in the slave device. After configuration is complete, the slave device negotiates a second high speed serial link containing a second number of high speed serial lanes between the master device and the slave device during a first operations mode. The slave device exchanges data with the master device over the second high speed serial link while the slave device performs a function for which the slave device has been configured. The first number of high speed serial lanes is smaller than the second number of high speed serial lanes.

The foregoing, together with other features, embodiments, and advantages of the present disclosure, will become more apparent when referring to the following specification, claims, and accompanying drawings.

Example Embodiments

As noted above, one context in which the use of high speed serial links can be useful is in communications between a master device and a slave configurable device.

One example of a protocol that can be used to create such high speed serial links is PCI Express, an architecture developed by Intel Corporation for creating high speed data links. Other examples of protocols for high speed serial links are Ethernet, Serial RapidIO (SRIO), and Interlaken. PCI Express is discussed in describing embodiments of the present application, as PCI Express is a commonly used protocol, but it should be understood that the invention is not limited to systems using the PCI Express protocol. The present invention could be used in connection with any system utilizing high speed serial links to configure a slave device, or even, any system in which a master device and a slave device are connected by a link composed of different lanes or sub-links, for example, Hyper/Transport.

To provide some background, a PCI Express system, for example, provides data transfer connections based on a serial physical-layer communications protocol. The physical-layer consists not of a conventional bus, but of a network of serial interconnections which extend to each PCI Express adapter from a PCI Express root complex. The PCI Express root complex is a computer hardware chipset that handles communications between the components of a computer system, and can include a host bridge for communicating with one or more computer processors. The PCI Express root complex can also include a number of ports that each provides data communication with a port on a PCI Express device.

A connection between any two PCI Express ports is referred to as a "link". A link consists of a collection of one or more lanes used for data communications between PCI Express devices. Each lane is a set of two unidirectional low voltage differential signaling pairs of transmission pathways. Because transmitting data and receiving data are implemented using separate differential pairs, each lane allows for full-duplex serial data communication. The ability to combine several lanes together to form a link allows PCI Express technology to provide scalable bandwidth.

As noted above, various embodiments of the present application provide techniques and mechanisms for configuring slave configurable devices using high speed serial links, such as PCI Express.

The embodiments of the present invention described below are not meant to limit the scope of the present invention.

It will be understood that various specific features of the described implementation may be varied without departing from the spirit of the present invention. Moreover, it will be understood that various features of different implementations described in this disclosure may be combined in another embodiment.

FIG. 1 is a simplified block diagram showing an example embodiment of a high speed serial link system connecting a master device to a slave device.

As shown in FIG. 1, master device 110 is connected via a high speed serial link 120 to slave configurable device 130.

Master device 110 may include a PCI Express root complex. Master device 110 may also function as a user device.

The high speed serial link 120 may include a group of lanes, each of which consists of a set of two unidirectional low voltage differential signaling pairs of transmission pathways, for example. In one embodiment, data can be transmitted and received data using separate differential pairs; therefore, each lane can allow for full-duplex serial data communication. FIG. 1 shows serial link 120 having sixteen lanes—Lane0 through Lane15. For purposes of description, this link will be discussed as being formed based on PCI Express protocol.

When a PCI Express high speed serial link is formed, the two devices connected by the link may negotiate to determine the number of lanes in the serial link that the devices will use to communicate. A link width may be selected based, for example, on the amount of processor or memory resources which the devices have available to receive or send the data to be transmitted over the link.

Generally, during normal use of slave device 110 and master device 130, it is desirable to negotiate the highest possible bandwidth link—that is, that will utilize the most possible lanes of the link—as long as the slave and master devices can receive/send data at that bandwidth. This is because such use provides the fastest performance.

Thus, if both master device 110 and slave device 130 are capable (for example, in terms of available memory or processor resources) of handling a maximum bandwidth that high speed serial link 120 can provide, typically, they will negotiate to create a connection over serial link 120 that utilizes all sixteen lanes of serial link 120. That is they will negotiate to send and receive data using the full lane width of serial link 120.

Where a PCI Express system is being used to handle communications between a master device and a slave configurable device, it will frequently be responsible for transporting configuration data, that is, instructions for configuring the slave device, as well as working data, that is, the data transmitted between the master device and slave device once configuration of the slave device has been completed, and the master device and slave device are communicating in the course of normal operations.

The inventors realized that Field Programmable Gate Arrays (FPGAs) and other devices that are configurable, face a particular challenge when a serial link containing a large number of lanes is used for transmitting configuration data between master device 110 and slave configurable device 130. As described below, receiving configuration data on a large number of lanes of a serial link can raise problems for slave configurable device 130.

Figure 2:
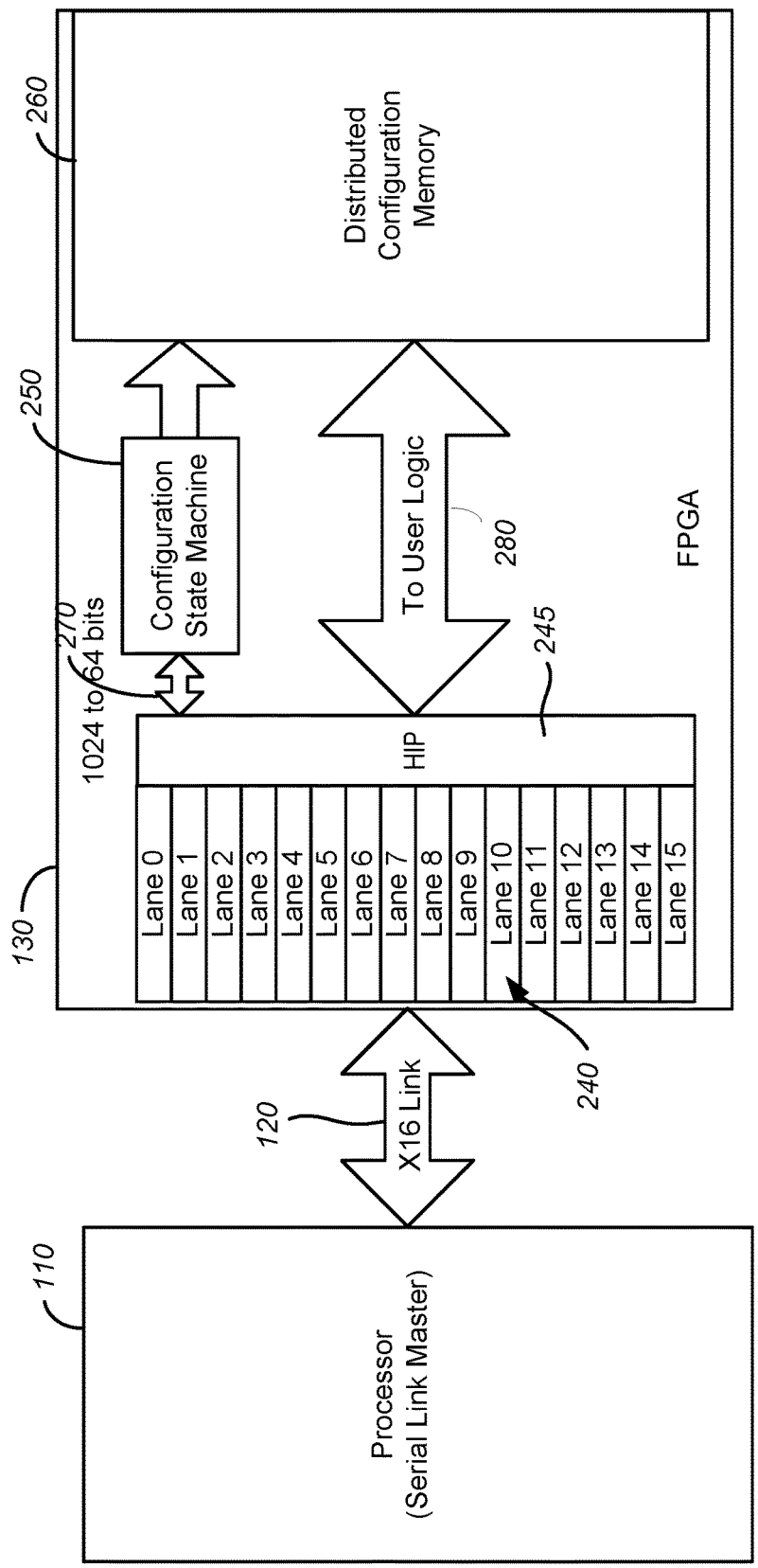
FIG. 2 is a simplified block diagram of a master device and a slave configurable device according to an embodiment of the present disclosure.

FIG. 2 is a simplified block diagram showing an example embodiment of a high speed serial link system connecting a master device to a slave device. This Figure shows further detail regarding slave device 130.

As shown in FIG. 2, the data sent by master device 110 over serial link 120 is received by slave device 130 at high speed serial interface (HSSI) 240. HSSI is an interface developed to address the needs of high speed interfaces. HSSI 240 then, in one embodiment, passes the data to hard IP (HIP) block 245. HIP takes the data and processes it into a form capable of being used by slave device 130. This may involve, among other things, taking sub-blocks of data separated for purposes of transmission over high speed serial link 120, and putting them back into a proper sequence for use by the slave device.

After processing the data, HIP 245 then sends the data onto configuration state machine 250. It is configuration state machine 250 that actually uses configuration data sent by master device 110 to configure distributed configuration memory 260 of slave configurable device 130. That is, configuration state machine 250 is responsible for taking configuration data sent by master 110 and using it to program distributed configurable memory 260 of slave device 130, so that slave device 130 can perform the desired functions.

Then, after slave device 130 has been configured to perform a particular function, communication link(s) 280 are used to transmit data between now configured distributed memory 260 and master device 110 as they interact in the course of normal operations.

Figure 3:
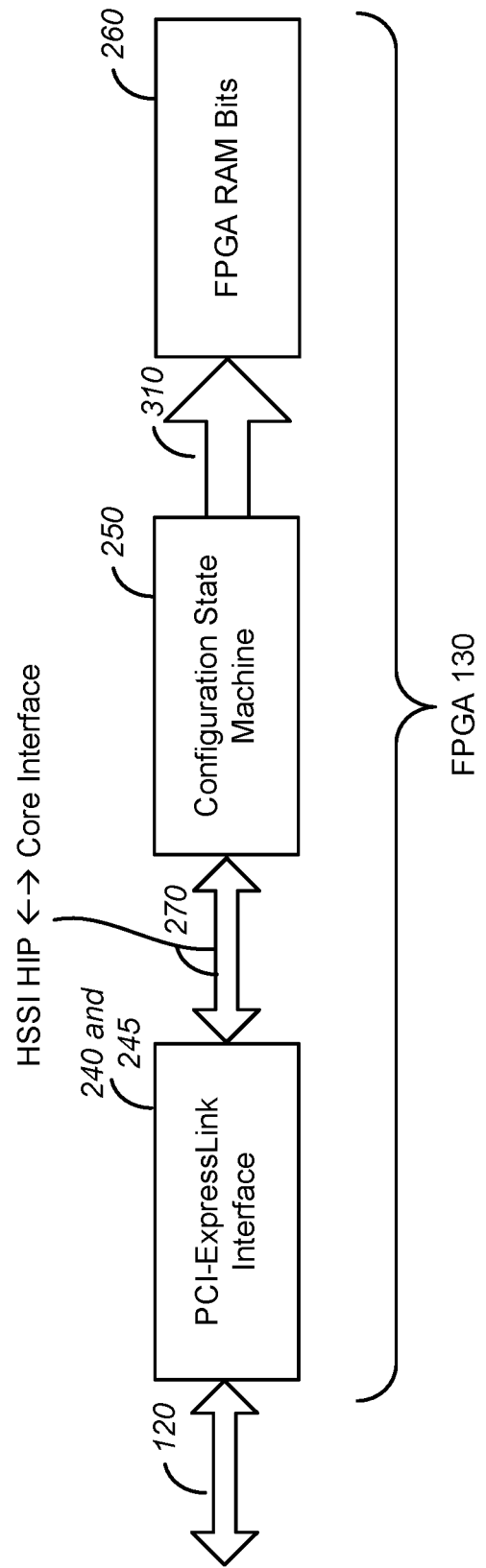
FIG. 3 is a simplified block diagram of a slave configurable device according to an embodiment of the present disclosure.

FIG. 3 is a simplified block diagram showing the interaction between (a) the HSSI 240 and HIP 245 block, which serves as the interface between high speed serial link 120 and slave configurable device 130, (b) configuration state machine 250 and (c) distributed configurable memory 260 of slave device 130. Importantly, the PCI Express interface block (which is composed of HSSI 240 and HIP 245) must send data to configuration state machine 250 over communication link(s) 270 in order for configuration to occur. Configuration state machine 250 then sends instructions to distributed configurable memory 260, over one or more communication links 310, to configure the device. While the number of wires or other transmission medium required to create communication link(s) 270 may vary, sufficient wires or other transmission medium to transmit data received in each lane of serial link 120 to configuration state machine 250. This may require a TX/RX pair of wires for each lane of data received by HSSI 240 in some embodiments.

As PCI Express and other high speed serial link protocols have become increasingly popular, one challenge facing developers of configurable slave devices such as FPGA device 130 is insuring that the configurable device is capable of interacting with high speed links having more and more lanes. Frequently, the response has been to create configurable devices which contain, among other things, a substantial amount of infrastructure in terms of medium to support communication link(s) 270 that connect the PCI Express interface block (composed, for example, of HSSI 240 and HIP 245) with configuration state machine 250.

However, having a large number of wires or other medium connecting configuration state machine 250 to HSSI 240 and HIP 245 can itself present significant challenges in terms of designing a configurable device. For example, configuration state machine 150 will have to be located on slave device 130 in a location where a number of links can be connected. Also, during fabrication, care will have to be taken to insure that all of the wires in communication links) are properly constructed, to minimize transmission skew, and to minimize signal interference between the different wires, among other things.

Further, only one HSSI 140 is shown in FIG. 2, but typically, there are multiple high speed serial interfaces (HSSI's) 140 on a configurable device. Thus the design and fabrication problems of supporting communication link(s) 270 shown in FIG. 2 will be compounded in an actual configurable device. And that challenge will only increase as more lanes are added to high speed serial links as is likely to occur in the future.

Figure 4:
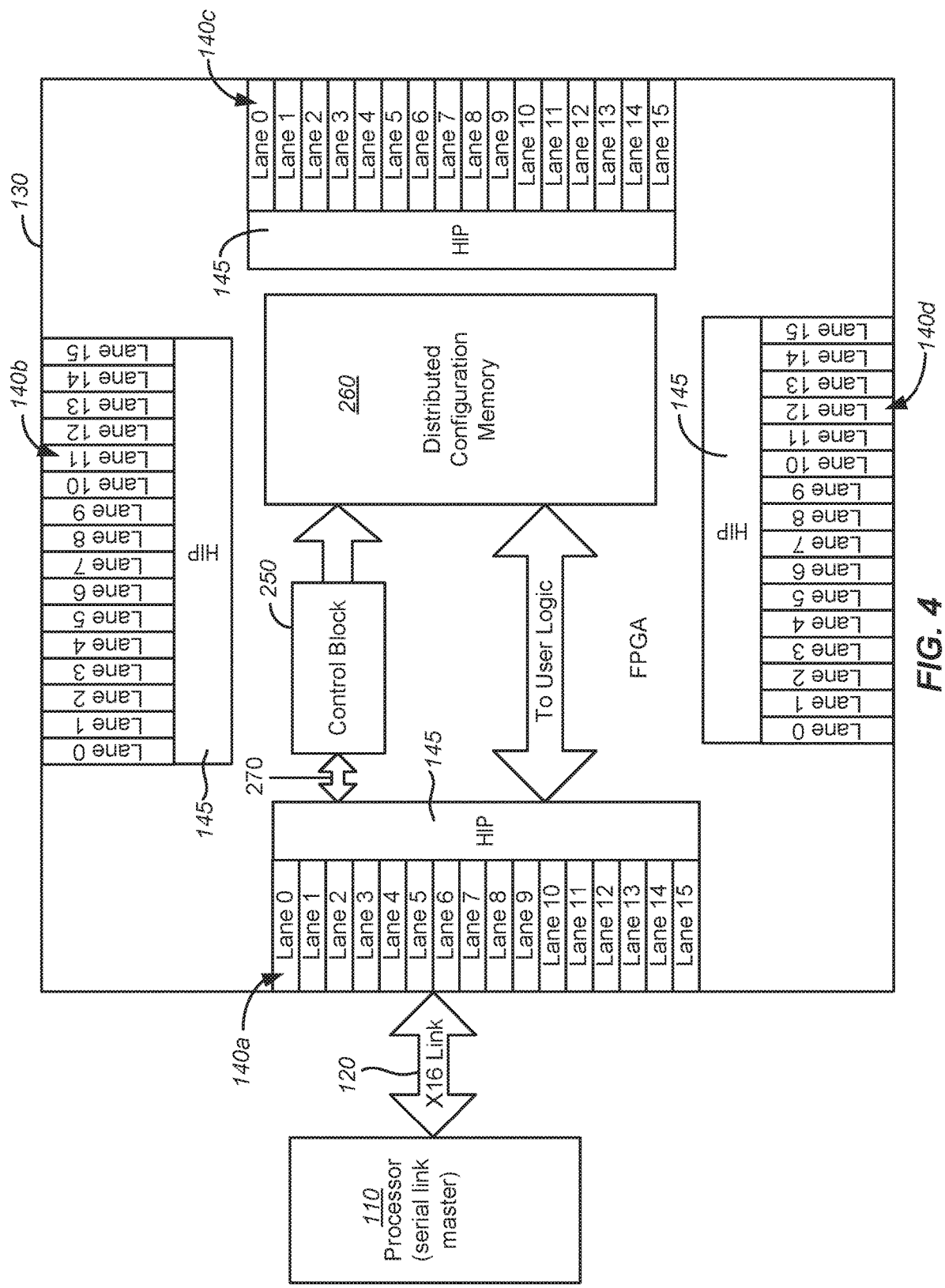
FIG. 4 is a simplified block diagram of a master device and a slave configurable device according to an embodiment of the present disclosure.

FIG. 4 is a simplified block diagram showing an example embodiment of a high speed serial link system connecting a master device to a slave device. Slave configurable device 130 is shown in this Figure as having multiple HSSI interfaces 140*a*-*d*.

In this embodiment, each HSSI 140*a*-*d* receiving configuration data may need to be connected to configuration state machine 250 in order for proper configuration to occur.

Locating the HSSI's so they are contiguous to one another may partially address the challenges of having multiple communication lines 270 providing configuration data to configuration state machine 250. However, this solution may require more silicon area, increase the costs associated with designing and fabricating the device, and otherwise complicate the process of developing slave configurable device 130.

For example, HSSI's are as a general rule placed on the boundaries of a device where it is generally most efficient to locate interfaces to other devices. Thus requiring that they are all contiguous to one another can be difficult.

As shown in FIG. 4, HSSI 440*a* is located on the left edge of the device. HSSI 440*b* is located on the right edge of the device. HSSI 440*c* is located on the top edge of the device. HSSI 440*d* is located on the bottom edge of the device As noted above, during normal operation, it is usually desirable to send data on as many links as possible in order to provide faster performance. For purposes of configuration, however, as shown above, sending the configuration related data on many links can actually pose significant problems for the slave device, because the slave device is then forced to support communications between the entry point of each lane of the serial link, and the slave device's configuration state machine.

Insuring that data from each of HSSI's 440*a*-*d* reach configuration state machine 250 at the same time becomes a harder challenge. The design and fabrication challenges created by trying to link each HSSI 440*a*-*d* to configuration state machine 150 can in some cases become impractical from either a cost and efficiency perspective.

Accordingly, the inventors have devised a system where slave device 130 negotiates a connection with master device 110 with fewer data lanes for us during configuration mode, and then, after configuration has been completed, renegotiating the connection to include a larger number of lanes for use during normal operations mode.

Figure 5:
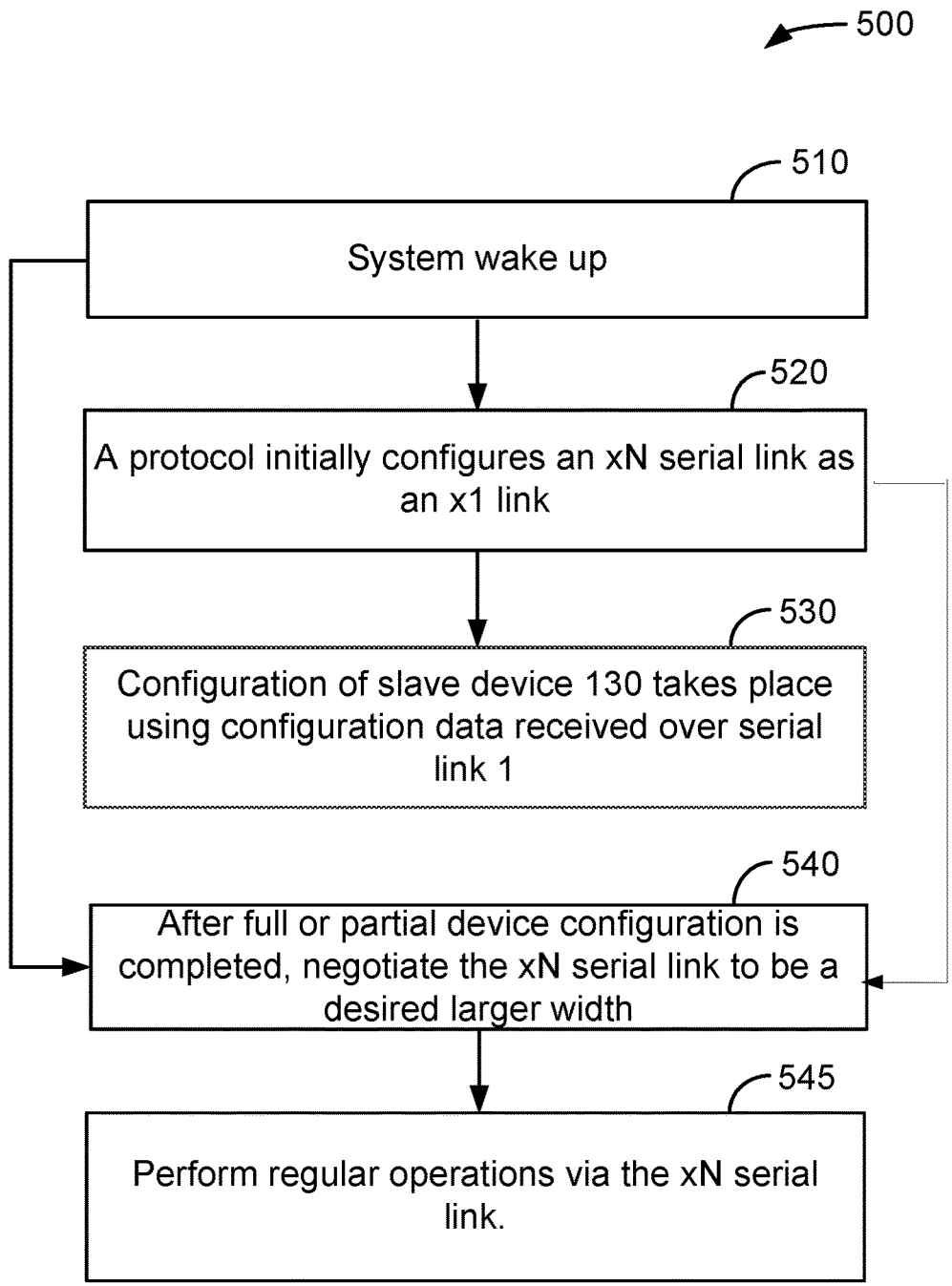
FIG. 5 is a simplified high-level flowchart depicting different features of an example method according to an embodiment of the present disclosure.

FIG. 5 is a simplified high-level flowchart depicting different features of an example method according to an embodiment of the present disclosure.

According to an embodiment of the present disclosure, at 510, a system wake up occurs.

At 520, a protocol, for example, Serial Lite, or a user state machine at slave device 130 initially configures an xN serial link (for example, high speed serial link 120) as an x1 link, that is, a link that uses one lane. Note that the configuration may take place with one lane, or with another minimal link width supported by the high speed serial link protocol. The important factor for purposes of various embodiments of the present disclosure is that the link width for configuration, is smaller than the link width used after configuration is completed for use during normal operation. Note that the configuration at issue may be full or partial configuration (partial reconfiguration for example may involve reconfiguration of only a subset of the blocks configured during full configuration); initial configuration or later reconfiguration (later reconfiguration may involve a later full or partial reconfiguration of blocks of configurable memory to perform a different function).

At 530, configuration of slave device 130 takes place using configuration data received over serial link 120. The configuration data is transmitted over the single lane of serial link 120 configured at 520.

At 540, after full or partial device configuration is completed, the slave device 130 negotiates the xN serial link to be a desired larger width (where N=2, 4, 8, 16, for example). That is, during configuration mode, a first link width is used, and then the link width is expanded to a desired link width for use during the general operations mode where the master device is interacting with the configured slave device.

At 545, perform regular operations during the first operations mode using the xN serial link.

The above embodiment of the present disclosure enables, for example, FPGA configuration via PCI Express in a single lane configuration. Further, the embodiment allows the different lanes of x16 link 120 to be physically non-contiguous, which is also useful for implementation modularity and flexibility.

According to other embodiments of the present disclosure, a protocol such as PCI Express may also be used with system firmware.

In such an embodiment, there is a system wakeup.

Configuration-via-PCI-Express aware firmware in a PCI-Express root complex in master device 110 programs slave configurable device 130 via a given lane width serial link, for example, a x8 link.

The firmware re-negotiates the link to a larger lane width serial link, for example, a x16 link.

Embodiments of the present application provide advantages in designing and fabricating configurable devices such as slave configurable device 130 which have the capability to connect with high speed serial links, by reducing the area of a configurable device required to support connections 270 between HSSI 240 and configuration state machine 250, as well as reducing nonrecurring expenses associated with the design and fabrication of configurable device chips.

Further, embodiments of the present application remove the need to have contiguous HSSI 440 or HIP 445 blocks. This has the benefit of reducing acute signal congestion at the interface due to sharing of core fabric signals between multiple HIP and HSSI channels. Further, it removes the challenge of coordinating the timing issues relating to HSSI to core data transfer, as well as the associated challenges involved in IP integration.

Further, embodiments of the present application provide the advantage that they provide an approach to configuration of a programmable device using a serial link that could be readily applied to different types of programmable devices, thus offering a solution that could become a general standard.

Figure 6:
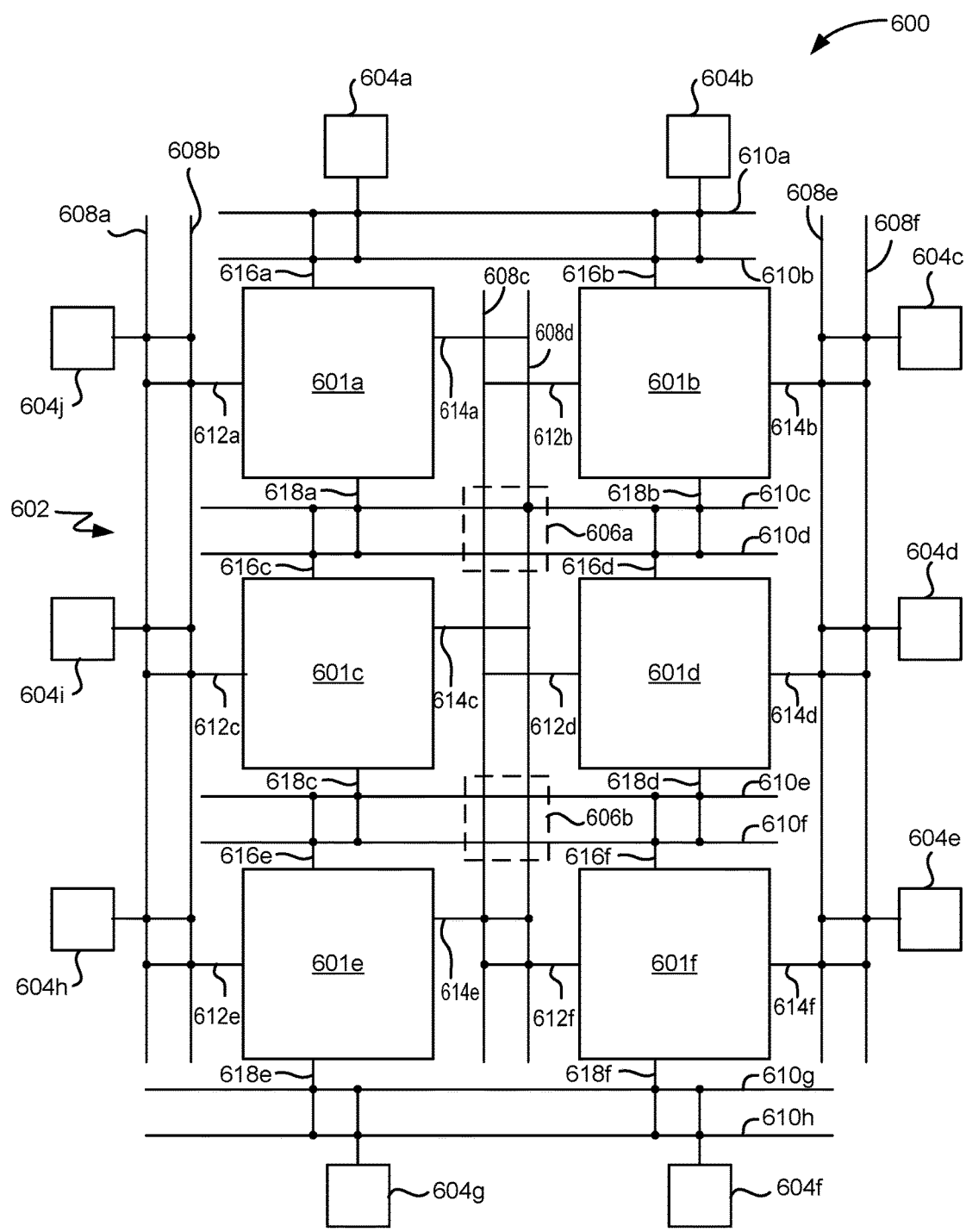
FIG. 6 is a simplified block diagram of a programmable logic device according to an embodiment of the present disclosure.

As noted above, various embodiments of the present disclosure may be used to design electronics components, including, for example, a programmable logic device (PLD). FIG. 6 illustrates a PLD which may be designed using techniques and mechanisms described in the present disclosure.

A PLD may comprise a plurality of logic array blocks containing logic elements (LEs), look up tables (LUTs), and other elements, which a user may use as building blocks to implement desired features. For example, referring to FIG. 6, a programmable logic device (PLD) 600 may be a field programmable gate array (FPGA). In various embodiments, PLD 600 may include multiple logic array blocks 601 (LABs), a routing architecture 102, multiple input/output (IO) pads 104, and switches 606. It is appreciated that one or more of the LABs 601 and switches 106 may be configured using configuration data. LABs 601 may be coupled to each other via the routing architecture 602 and/or one or more switches 606. The routing architecture 602 may include multiple vertical LAB lines 608 and multiple horizontal LAB lines 610. LABs 601 may have one or more LAB inputs 612 and one or more LAB outputs 614. LABs 601 may also have, in the vertical direction, one or more LAB inputs 116 and one or more LAB outputs 618. It is noted the signals may also go in the opposite direction with the items designated 612 and 616 representing LAB outputs, and the items designated 614 and 618 representing LAB inputs. IO pads 604 may be coupled to the routing architecture 602.

In one embodiment, LAB 601a may receive an input signal from IO pad 604j through the LAB input 612a. In some embodiments, the LAB 601b may receive an input signal from another LAB, e.g., LAB 601a via LAB input 612b. It is appreciated that LAB 601b may output the received signal via LAB output 614b to the IO pad 604c. The IO pad 604c may send the output signal to an off-chip device (not shown). In certain embodiments, the off-chip device may be located on a chip separate from a chip on which PLD 600 may be located.

Although six LABs 601 are shown in FIG. 6, it is noted that in various embodiments, PLD 600 may include a different number of LABs 601. Moreover, although ten IO pads 604 are shown in FIG. 6, in some embodiments, a different number of IO pads 604 may be used.

Any of LABs 601 may include one or more logic elements (LEs). The logic elements may include n-input look-up tables, flip-flops, such as a D flip-flop or a JK flip-flops, one or more multiplexers, among other things.

Some PLDs provide some blocks of one or more LABs 601 which are configured to perform certain functions which a user may find useful. For example, a PLD might be configured such that a group of LUTs, flip flops and other elements of a PLD are designed to implement an TO interface, a transceiver, a memory controller, or some other desired functionality. In some embodiments, such a functional block may use one or more LABs that span multiple rows and/or multiple columns within a PLD.

While the disclosure has been particularly shown and described with reference to specific embodiments thereof, it will be understood by those skilled in the art that changes in the form and details of the disclosed embodiments may be made without departing from the spirit or scope of the disclosure. For example, embodiments of the present disclosure may be employed with a variety of network protocols and architectures. It is therefore intended that the disclosure be interpreted to include all variations and equivalents that fall within the true spirit and scope of the present disclosure.

What is claimed is:

1. An integrated circuit, comprising:
configuration memory that controls circuitry of a field programmable gate array (FPGA) fabric;
a plurality of PCI Express blocks, wherein the plurality of PCI Express blocks are configured to receive operating data, and wherein the plurality of PCI Express blocks consists of a single PCI Express block configured to receive configuration data;
configuration circuitry configured to receive the configuration data from the single PCI Express block and provide the configuration data to the configuration memory; and
a dedicated link between the single PCI Express block and the configuration circuitry to transmit the configuration data from the single PCI Express block to the configuration circuitry, wherein the configuration data comprises instructions to configure the integrated circuit, and wherein the operating data comprises data communicated to the integrated circuit after the integrated circuit is configured using the configuration data.

2. The integrated circuit of claim 1, wherein the dedicated link comprises an access port that must be used to send the configuration data to the configuration circuitry.

3. The integrated circuit of claim 1, wherein the single PCI Express block is configured to receive the configuration data via PCI Express aware firmware in a PCI Express root complex of another electronic device.

4. The integrated circuit of claim 1, wherein the plurality of PCI Express blocks excluding the single PCI Express block cannot access the configuration circuitry via any dedicated link.

5. The integrated circuit of claim 1, wherein the configuration circuitry is configured to send instructions to the configuration memory to configure the integrated circuit.

6. The integrated circuit of claim 1, wherein the configuration circuitry is configured to perform partial reconfiguration of the integrated circuit over PCI Express.

7. A method comprising:
receiving operating data at a field programmable gate array (FPGA) via a plurality of PCI Express blocks, wherein the plurality of PCI Express blocks are configured to receive the operating data, and wherein the plurality of PCI Express blocks consists of a single PCI Express block configured to receive configuration data;
receiving configuration data at configuration circuitry via the single PCI Express block;
sending the configuration data from the single PCI Express block to the configuration circuitry via a dedicated link that couples the configuration circuitry to a configuration memory to transmit the configuration data from the single PCI Express block to the configuration circuitry, wherein the configuration data comprises instructions received by the single PCI Express block to configure the FPGA, wherein the configuration memory controls circuitry of the FPGA; and upon configuring the FPGA, receiving the operating data, wherein the operating data comprises data communicated to the FPGA after the FPGA is configured using the configuration data.

8. The method of claim 7, comprising configuring the FPGA via partial reconfiguration of the configuration memory after receiving the configuration data at the FPGA via the single PCI Express block.

9. The method of claim 7, wherein the dedicated link comprises a connection that must be used to send the configuration data to the configuration circuitry from the single PCI Express block.

10. The method of claim 7, wherein another electronic device provides configuration data via PCI Express aware firmware in a PCI Express root complex.

11. The method of claim 7, comprising selecting a link width based on an amount of processor or memory resources that the FPGA, another electronic device in communication with the FPGA via the plurality of PCI Express blocks, or both, have available to receive or send data.

12. A programmable logic device (PLD), comprising:
a plurality of PCI Express blocks, wherein the plurality of PCI Express blocks are configurable to receive operating data, wherein the plurality of PCI Express blocks consists of only a single PCI Express block configurable to receive configuration data;
configuration circuitry that receives the configuration data from the single PCI Express block and provides configuration instructions to configuration memory of the PLD to program the PLD; and
a link that couples only the single PCI Express block to the configuration circuitry to transmit the configuration data from the single PCI Express block to the configuration circuitry, wherein the configuration data comprises instructions to configure the PLD, and wherein the operating data comprises data communicated to the PLD after the PLD is configured using the configuration data.

13. The PLD of claim 12, wherein the plurality of PCI Express blocks comprises high speed serial interface circuitry and hard IP circuitry.

14. The PLD of claim 12, comprising wiring configured to transmit configuration data received by the single PCI Express block to the configuration circuitry.

15. The PLD of claim 12, wherein the link comprises a dedicated connection that must be used to send data to the configuration circuitry from the single PCI Express block.

16. The PLD of claim 12, wherein the configuration circuitry comprises a configuration state machine.

17. The PLD of claim 12, wherein the configuration circuitry is configured to send the instructions to the configuration memory to configure the PLD.

18. The PLD of claim 12, wherein the configuration circuitry is configured to perform partial reconfiguration of the PLD over PCI Express.

19. The PLD of claim 12, wherein the plurality of PCI Express blocks are noncontiguous with each other.

20. A field programmable gate array (FPGA), comprising:
a plurality of PCI Express blocks, wherein the plurality of PCI Express blocks are configurable to receive operating data such that the plurality of PCI Express blocks receive the operating data, and wherein the plurality of PCI Express blocks consists of only one PCI Express block configurable to receive configuration data;
configuration circuitry that receives the configuration data from the one PCI Express block and provides configuration instructions to configuration memory of the FPGA to program the FPGA; and
a dedicated link that couples the one PCI Express block to the configuration circuitry to transmit the configuration data from the one PCI Express block to the configuration circuitry, wherein the configuration data comprises the instructions to configure the FPGA, and wherein the operating data comprises data communicated to the FPGA after the FPGA is configured using the configuration data.

21. The FPGA of claim 20, wherein the operating data is received over a first number of lanes of the plurality of PCI Express blocks and the configuration data is received over a second number of lanes of the one PCI Express block, wherein the second number of lanes is smaller than the first number of lanes, and wherein the second number of lanes comprises a single lane.

22. The FPGA of claim 20, wherein the plurality of PCI Express blocks are noncontiguous with each other.

23. The FPGA of claim 20, wherein the plurality of PCI Express blocks comprise high speed serial interface circuitry and hard IP circuitry.

24. The FPGA of claim 20, wherein the dedicated link comprises a connection that must be used to send data to the configuration circuitry from the one PCI Express block.

25. The FPGA of claim 20, wherein the configuration circuitry is configured to perform partial reconfiguration of the FPGA over PCI Express using the one PCI Express block.

* * * * *